US008527362B2

(12) United States Patent
Ishag et al.

(10) Patent No.: US 8,527,362 B2
(45) Date of Patent: Sep. 3, 2013

(54) SEARCHING APPARATUS

(75) Inventors: Daniel Ishag, London (GB); Sebastian Luke Bishop, London (GB); Nicholas Desmond James Bancroft Cooke, London (GB); Judd Harcombe, Seattle, WA (US)

(73) Assignee: Adknowledge, Inc., Kansis City, MO (US)

( * ) Notice: Subject to any disclaimer, the term of this patent is extended or adjusted under 35 U.S.C. 154(b) by 0 days.

(21) Appl. No.: 13/540,796

(22) Filed: Jul. 3, 2012

(65) Prior Publication Data

US 2012/0271818 A1  Oct. 25, 2012

Related U.S. Application Data

(63) Continuation of application No. 13/236,017, filed on Sep. 19, 2011, now Pat. No. 8,219,455, which is a continuation of application No. 10/296,036, filed as application No. PCT/GB01/02330 on May 24, 2001, now Pat. No. 8,032,418.

(30) Foreign Application Priority Data

May 24, 2000  (GB) .................................... 0012668.0
Jan. 24, 2001  (GB) .................................... 0101842.3

(51) Int. Cl.
*G06Q 30/00*  (2012.01)

(52) U.S. Cl.
USPC ........................................................ 705/26.1

(58) Field of Classification Search
USPC ........................................................ 705/26.1
See application file for complete search history.

(56) References Cited

U.S. PATENT DOCUMENTS 6,519,584 B1 * 2/2003 Tognazzini et al. ........... 715/769

* cited by examiner

*Primary Examiner* — Mila Airapetian
(74) *Attorney, Agent, or Firm* — Meunier Carlin & Curfman, LLC

(57) ABSTRACT

A search engine at a service provider is configured to identify commercial suppliers in response to a keyword specified by a user. Keywords are received and searches are performed on an index database to identify displayable text items. Images are stored in the form of commercially relevant graphical images such as logos. A logo is linked to each item of displayable text and an output list is produced in which each text item includes a displayable graphical image. The system may store different image formats to allow the graphical images to be displayed on a variety of platforms.

1 Claim, 11 Drawing Sheets

SEARCHING APPARATUS

CROSS-REFERENCES TO RELATED APPLICATIONS

This application is a continuation of U.S. patent application Ser. No. 13/236,017, filed Sep. 19, 2011, entitled: Searching Apparatus, now U.S. Pat. No. 8,219,455, which is a continuation of U.S. patent application Ser. No. 10/296,036, filed Jun. 6, 2003, entitled: Searching Apparatus and a Method of Searching, now U.S. Pat. No. 8,032,418, which is a 371 of PCT/GB01/02330, entitled: Searching Apparatus and a Method of Searching, filed May 24, 2001, all of these patent applications incorporated by reference herein.

BACKGROUND OF THE INVENTION

1. Field of the Invention

The present invention relates to searching and in particular relates to searching apparatus configured to identify commercial suppliers in response to a specified key word.

2. Description of the Related Art

Search engines that facilitate the searching of available data that may be supplied in electronic form are well known. Initially, these search engines were established by academic institutions and were configured primarily to disseminate research information and similar studies.

More recently, searching activities of this type have been deployed in more commercial environments. In particular, in response to a user's request for commercial information, possibly identifying suppliers of particular goods or services, search engines are known that can provide a list of suppliers that are available to provide goods or services of the requested type.

When services of this type have been implemented using internet technology, it is common practice for the search results to be provided to a user without charge, thereby remaining consistent with other internet activities. Thus, a search engine may provide a list of contacts in the form of a web page having links to supplier's websites etc. When a user accesses a supplier's website via the search material, the search provider obtains information to this effect. The service provider is then in a position to submit a charge to the advertising supplier based on the number of hits that have taken place. It is therefore advantageous from the service provider's perspective for the service to be used and for many hits to occur. A problem with this approach is that the information provided by known search engines makes the information available in a relatively dry form and as such users are less encouraged to make active use of the service and are not attracted to particular suppliers. Furthermore, the user is often presented with long lists of data from which it is often very time consuming and tedious to selected a desired supplier's web site.

It is an object of the present invention to at least substantially reduce or overcome the above described problems.

BRIEF SUMMARY OF THE INVENTION

According to an aspect of the present invention, there is provided Searching apparatus configured to identify commercial suppliers in response to a specified keyword, the apparatus comprising: input means arranged to receive an input keyword; searching means configured to search a database indexed with respect to specified keywords to identify displayable text items related to said input keyword, each item regarding one of said commercial suppliers; image storage means arranged to store graphical images, each graphical image identifying a commercial supplier; linking means configured to link each stored graphical image with a respective one of the displayable text items; and output means configured to supply data defining a list of said identified text items and any respective linked displayable graphical images selected by said linking means.

The present invention provides a rapid recognition of a supplier from a list of textual information by virtue of the provision of a recognizable graphical image identifying or associated with the supplier. This in turn leads to less browser fatigue when considering search results and makes searching much easier.

In a preferred embodiment, the input means is a computer, a web enabled television, a mobile telephone or a hand-held computer. Preferably, the searching means includes a relational database with a plurality of related tables and the image store may be arranged to store representations of logos. Preferably, the logos are stored in a plurality of formats such as those appropriate for a personal computer, a web television, a mobile phone or a hand-held computer or any combination of these formats.

According to a second aspect of the present invention, there is provided a method of searching for details of commercial suppliers, comprising the steps of: receiving an input keyword; searching an index of keywords to identify said input keyword and textural items associated therewith; linking a stored displayable graphical image identifying a commercial supplier to a respective one of the identified textural items; and producing an output list of textural items and any respective linked displayable graphical images selected by said linking step.

BRIEF DESCRIPTION OF THE DRAWINGS

A presently preferred embodiment of the present invention will now be described by way of example with reference to the accompanying drawings. In the drawings.

BEST MODE FOR CARRYING OUT THE INVENTION

Figure 1:
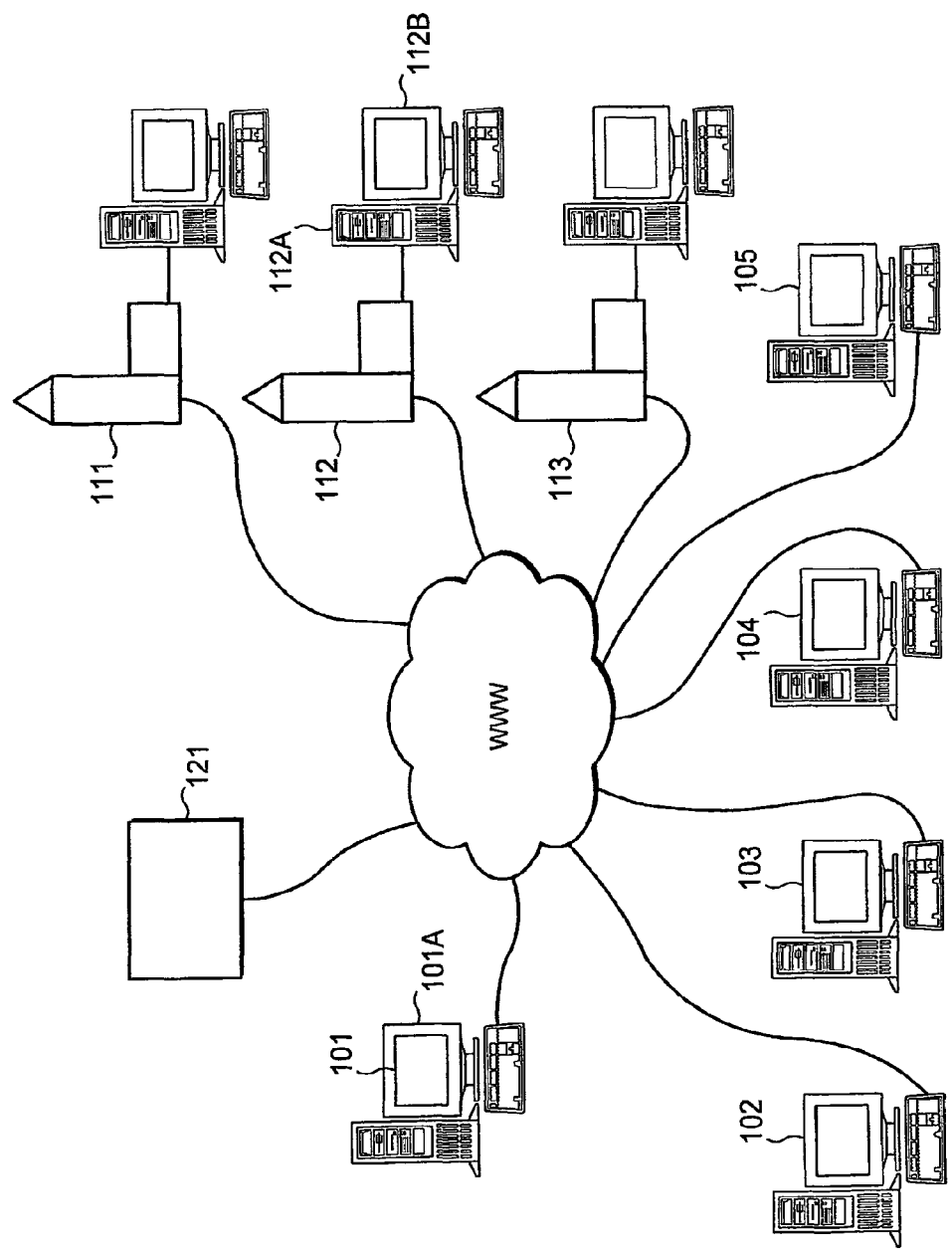
FIG. 1 shows an environment connecting a plurality of users over the world wide web.

An environment in which a plurality of users 101 to 105 are connected to the world wide web 100 is illustrated in FIG. 1. In accordance with http protocols, it is possible for users 101 to 105 to generate universal resource locations (URLs) which result in a particular website being interrogated and hypertext transfer protocol (http) pages being returned.

Many commercial organizations have made use of this environment therefore product and service suppliers 111, 112, 113 host electronic commerce (e-commerce) websites such that, in response to an enquiry being made to these websites by users 101 to 105 for example, it is possible for orders to be placed and for commercial transactions to be effected. A problem exists however in that for transactions of this type to take place it is necessary for the users 101 to 105 made aware of the specific URLs for the service and goods suppliers 111 to 113.

To facilitate this activity, service providers, such as service provider 121 support search engines. Thus, as an alternative to generating a URL that contacts a supplier directly, it is possible for a user, such as user 101, to direct a single URL to the service provider 121 that includes specific search terms or keywords. At the service provider, a system identifies these keywords and performs a search to identify particular suppliers that may be able to satisfy the demand expressed by the users.

Figure 2:
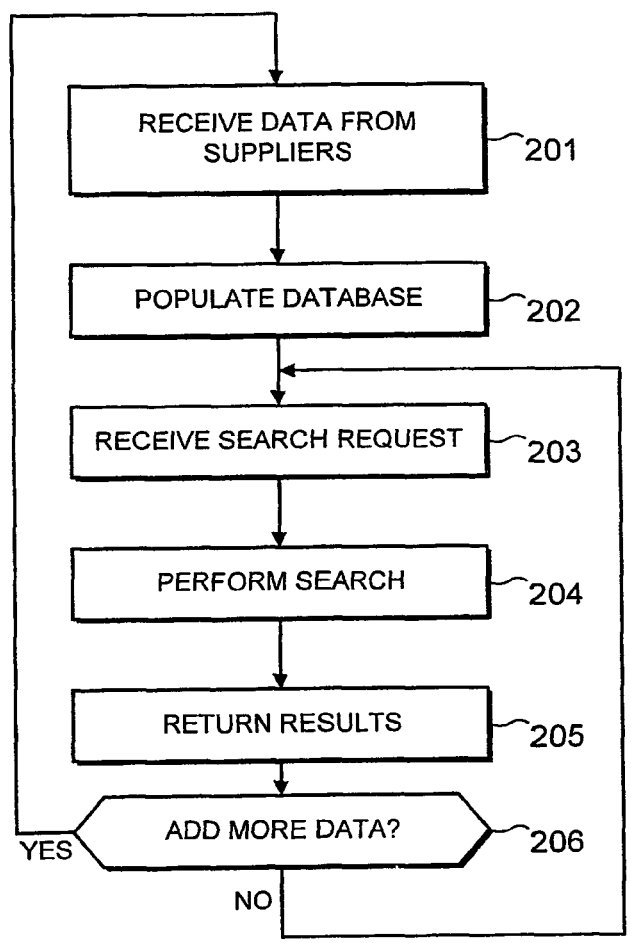
FIG. 2 shows procedures implemented within the environment shown in FIG. 1.

Procedures performed within the environment of FIG. 1 are shown in FIG. 2. At step 201 the service provider 121 receives data from suppliers 111 to 113. As this data is received, a local database is populated at step 202. This process is then ongoing as more and more data becomes available or is identified by the service provider.

At step 203 a search request is received from a user, such as user 101. At step 204 a search is performed and at step 205 the results of this search are returned to the user 101. The user 101 is then in a position to contact the suppliers 111 to 113 directly. However, when this is effected via data provided by the service provider 121, the service provider 121 is informed of this so that the service provider is made aware to the effect that its customers, i.e. the suppliers, have received a hit, and may therefore provide the basis for a charge being submitted. Consequently, at step 206 the question is asked as to whether any more data is to be submitted to the database. When answered in the affirmative, control is effectively directed to step 201. Alternatively, if answered in the negative, control is directed to 203.

Figure 3:
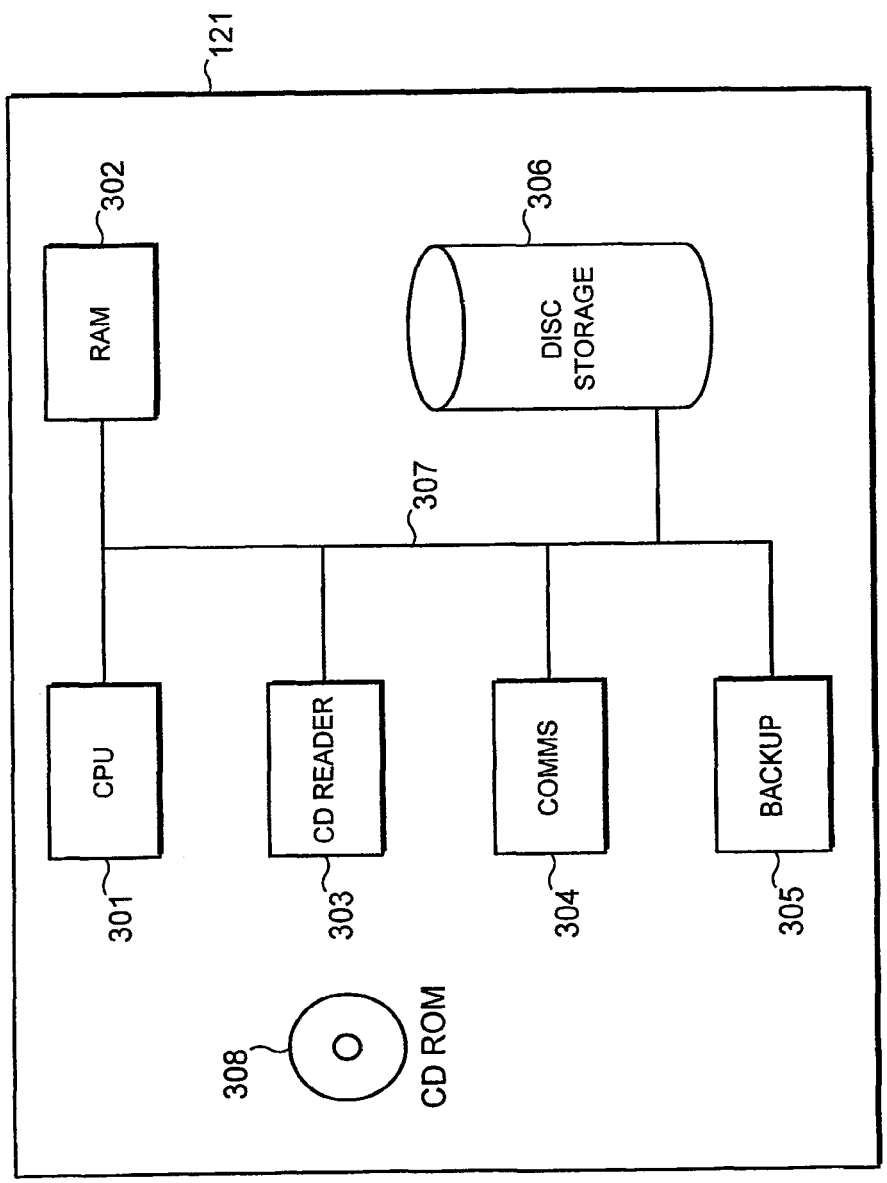
FIG. 3 details the structure of the service provider identified in FIG. 1.

The structure of service provider 121 is detailed in FIG. 3. A central processing unit 301, such as a Pentium III processor, communicates with, for example, 256 megabytes of random access memory 302, CD-reader 303, a communications interface 304, a backup tape streamer 305 and a ninety gigabyte (for example) disc store 306 over a bus 307. Instructions executable by the central processing unit 301 are read from RAM 302 after being installed via a data carrying medium in the form of a CD-ROM 308 receivable within the CD-ROM reader 303.

Figure 4:
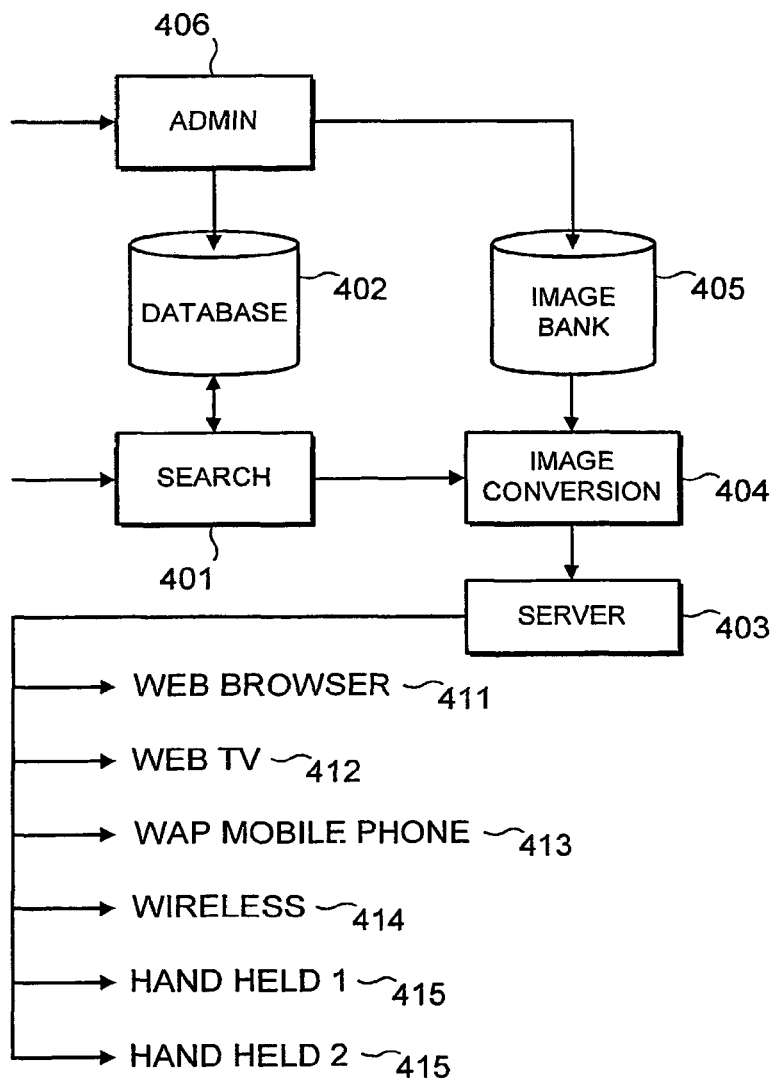
FIG. 4 illustrates operations performed by the service provider illustrated in FIG. 1.

Operations performed by service provider 121 are illustrated in FIG. 4. The service provider effectively provides a searching tool configured to identify commercial suppliers in response to specified keywords. Keywords defined by a user are supplied as input requests to a search engine 401. The search engine 401 accesses a database 402 that has been indexed with respect to specified keywords to identify displayable text items related to the input keyword or keywords. In addition to supplying this text information to a server 403, an image conversion process 404 provides a linking mechanism configured to associate or link a graphical image received from an image bank 405 to each item of displayable text. Image conversion process 404 in combination with a server 403 provide an output mechanism configured to supply data defining the identified text from database 402 with associated displayable graphical images selected from image bank 405.

In addition to performing searches, the system shown in FIG. 4 also receives configuration data from suppliers, such as suppliers 111 to 113, and this configuration data includes textural matter supplied to database 404 and graphical images supplied to image bank 405 under the control of an administration process 406.

In the preferred embodiment, the data stored in database 402 includes a title relating to a specific product or service or to a particular supplier. In addition, there is a description of the particular product or service and a URL allowing a web browser to make immediate contact with the supplier identified by the searching process.

Image bank 405 is preferably arranged to store a commercially related graphic often in the form of a particular supplier's logo. Thus, the provision of a graphical image bank 405 allows images to be stored for which a supplier may have conducted a large and ongoing marketing campaign so as to make their graphical image or logo familiar to a wide range of users. Thus, the inclusion of this logo in data relating to the commercial activities of an identified organization allows the user to identify a particular supplier more quickly and, in combination with background advertising activities, will tend to prompt a user to select or make contact with that organization to a greater extent than if the logo or graphical image were not there.

It is appreciated that the representation of graphical images requires different types of data for their presentation within different types of platforms. Image conversion process 404 is therefore not only required to combine a graphical image with a textural image received by the searching process 401 but it is also required to select a particular type of image dependent upon the nature of the equipment available to the requesting user. Selecting one of the several different pre-formatted images for a display device is considerably faster than the alternative of converting a standard image to the required format on the, fly (in real time). This way is preferred because of speed, even though the storage capacity requirements for the image bank 405 are greater.

Prior to combining a graphical image received from image bank 405 with textural matter received from process 401, it is required that the image conversion process 404 make reference to the particular type of end user equipment and thereafter select an appropriate image from image bank 405. Thus, as shown in FIG. 4, it is possible to select an image from image bank 405 appropriate for a standard web browser as indicated at 411. Alternatively, an image may be selected that is appropriate for being displayed on a web television, as indicated at 412, or a WAP enabled mobile telephone as indicated at 413, or in accordance with protocols required for other wireless transmission as indicated at 414 or in accordance with various protocols associated with handheld devices, as indicated at 415.

It is to the advantage of the service provider to include details of many commercial suppliers thereby making the service provided attractive to users. Similarly, as a service provider becomes more attractive to users, there is a greater incentive for suppliers to be included on the database which in turn creates a commercial pressure. Consequently, in order to sustain the service, the service provider submits a charge to suppliers and suppliers pay for the privilege of being included on the database.

A searching operation performed by searching, process 401 is capable of selecting particular entries included in database 402 in response to keywords supplied by users. In accordance with database terminology, such a process is usually referred to as a filter in that entries that include the particular keyword identified by a user are filtered exclusively such that a list is produced that contains only the entries for which the particular keyword is included. Unless specific measures are included within this process, the ordering of this list will tend to depend upon the order in: which the data was written to the database in the first place. For some searches, the length of the list could be quite large but recent studies have shown that most users will select a particular supplier after viewing at most two pages of information Thus, although hundreds of potential suppliers may be selected in response to a particular keyword, it is likely that only the first ten or so entries within a particular filtered search will be of interest to a user. Consequently, a commercial pressure is created not only to be included but also to be highly ranked.

Within the environment of database technology, it is possible to order entries with respect to one or more fields, usually in an ascending order, i.e. with the lowest value at the top or in a descending order with the highest value at the top. Thus, it is conventional practice to include a field within a searched table or query that dictates the order in which the entries are conveyed to users.

Within the present system, suppliers are invited to bid for their position in output listings. In terms of a bid, this may be organized as a fixed amount with, say, a highest bidder paying a fee in the region of hundreds of thousands of dollars. Alternatively, fees may be charged on a per hit basis. A hit occurs for a particular supplier when the search results presented to the user include a textual entry from that supplier. Thus, a supplier may bid thirty cents per hit and when their own website identifier receives a hit, the service provider notes that another thirty cents are to be charged to that particular supplier. Such an approach is often perceived as being preferable in that suppliers are not required to make any payment unless actual hits are generated.

Consequently, suppliers are invited to bid a per hit charge with respect to each keyword of interest. Thus, for the sake of this example, it is assumed that suppliers 111, 112 and 113 each produce musical instruments and each are keen to increase their sales of saxophones. Each are therefore interested in subscribing to the keyword "saxophone" such that when a user submits the keyword "saxophone" to the searching process, the suppliers 111 to 113 desire their presence to be identified, in terms of a title of the products they supply, a brief description and a link to their own website allowing further enquiries or actual orders to be submitted.

Each of the suppliers 111 to 113 are invited to bid for the privilege of being included on the database and for ranking within the database. Supplier 113 declares that they are not prepared to make a payment for this privilege, whereas supplier 111 is prepared to pay twenty cents per hit and supplier 112 is prepared to pay forty cents per hit. Consequently, these values are included within database 402 and when a search is executed with respect to the keyword "saxophone" all entries using this keyword will be filtered out and thereafter the entries will be ordered. Consequently, supplier 112, having made the highest bid, will be presented more highly in the list than supplier 111. At the discretion of the service provider, supplier 113, who is not prepared to pay anything, may or may not be included within the list. If included, supplier 113 will be placed at the bottom of the list.

Figure 5:
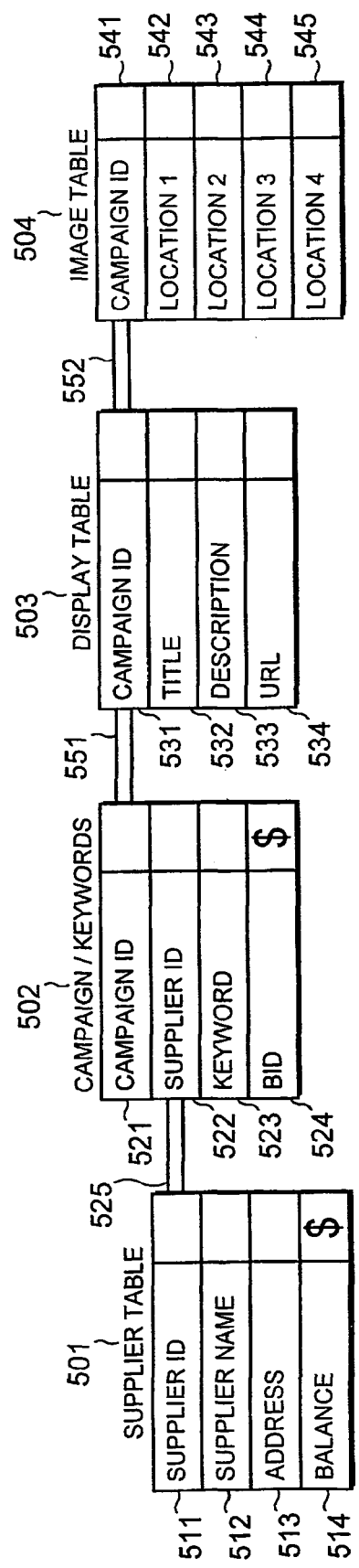
FIG. 5 details the structure of the database identified in FIG. 4.

Database 402 includes a plurality of tables, as illustrated in FIG. 5. These comprise a supplier table 501, a campaign/keywords table 502, a display table 503 and an image table 504. Supplier table 501 essentially includes information relating to the specific supplier and is included primarily for administration and accounting purposes. Thus, an entry at 511 comprises a unique supplier identification, followed by an entry at 512 identifying the supplier's name, an entry or entries at 513 identifying the supplier's address and an entry at 514 recording a balance, that is to say a totalized amount that should be invoiced to the supplier, based on filtered hits, at the end of the next accounting period. Thus, each time the particular supplier obtains a hit, through use of the services provided by service provider 121, the bid amount for the particular campaign is added to the balance recorded at 514.

Each supplier may express an interest in more than one keyword. Furthermore, the supplier's particular interests may vary from one keyword to another, reflecting particular marketing campaigns. Thus, it is known that supplier 112 in this example manufactures saxophones but supplier 112, having an expertise in piping, also supplies piping to the automotive industries. Supplier 112 appreciates that these represent completely separate markets and therefore separate campaigns exist for each of these markets. It is therefore preferable that, in response to a search being performed, different information is supplied to users requesting interests in saxophones compared to users expressing interests in automotive brake piping.

Service provider 121 has established a system that is sensitive to this possibility and as such the relationship between a particular supplier and a particular keyword is identified as a campaign. Thus, the total number of campaigns facilitated by the system may be considered as the sum of all keywords multiplied by the number of suppliers expressing an interest in each of the keywords. Thus, in the example, if each supplier 111 to 113 has expressed an interest in three keywords, the total number of campaigns considered by the system would be nine.

The database system 402 maintains a record of these particular campaigns within campaign keyword table 502. Consequently, table 502 includes an entry 521 that uniquely identifies the campaign, an entry identifying the particular supplier for that campaign at 522, an entry for the particular keyword of interest at 523 and an entry representing the bid, that is to say, the amount that a supplier is prepared to pay when the keyword specified at 523 is entered by a user and the service provider returns information generated by the supplier identified by the supplier identification at 522.

Database 402 is relational and as such a link 525 confirms that the supplier identification at 511 is linked to the supplier identification at 522. Consequently, upon identifying a particular campaign, as a result of a search being performed, it is possible to relate the information contained within table 502 back to the information contained within table 501, primarily resulting in further charges being accumulated within field 514.

The relationship between tables 501 and 502 defines how keywords are searched resulting in a list of entries being submitted to a user. A user then selects a particular entry which then defines a specific campaign. The link between tables 502 and 501 then allows a particular campaign to be associated with a particular supplier and for a financial accrual to be made in the balance entry 514. Thus, although a supplier may be signed up for several campaigns, when any of these campaigns is selected, a single balance entry at 514 is accumulated.

Display table 503 and image table 504 define the way in which information is selected for submission to users in filtered lists. Specific output information is stored for each campaign therefore table 503 and table 504 have a primary key defined by an entry for the campaign identification, as shown at 531 of table 503 and as shown at entry 541 for table

504. These campaign identifications are related to the campaign identification at 521 and are thereby relationally linked, as illustrated by link 551 and link 552.

Display table 305 stores textural information, in the form of a title field 532, a description field 533 and a URL field 534. When conveyed to a user this textural information is linked to a graphical image, usually in the form of a supplier's logo. The graphical image is read from image bank 405 in response to information received from database 402 and in particular with respect to information read from image table 504. Image table 504 includes references to particular files stored on image bank 405. For each campaign, image bank 405 stores a plurality of graphical images stored in appropriate formats. In the example shown in FIG. 5, the system is configured to select one of four types of graphical images and the particular location of the respective files are stored at 542 for the first type of file, a web browser, at location 543 for a second type of file, a web television image, at location 544 for a WAP mobile phone and at location 545 for a handheld personal digital assistant.

Thus, in operation, a keyword is detected by the search process 401. Process 401 is then configured to execute a search upon campaign table 502 by submitting SQL commands to the database 402. In relatively modestly sized systems, the searching operation may be performed dynamically as and when required. However, as the amount of data increases, it may be preferable to perform background housekeeping operations to maintain additional indexes such that, in response to particular keywords being identified, the rate at which data retrieval is performed may be increased significantly. However, as is understood in the art, the maintaining of these additional indexes does place additional strain upon the overall process and therefore a compromise must be reached in terms of the amount of time taken for a search to be conducted and the amount of background housekeeping performed in order to make additional indexes available.

For the purposes of this disclosure, it should be understood that an indexing operation non-exclusively includes background pre-preparation of dedicated additional indexes or a dynamic re-indexing of existing tables.

Figure 6:
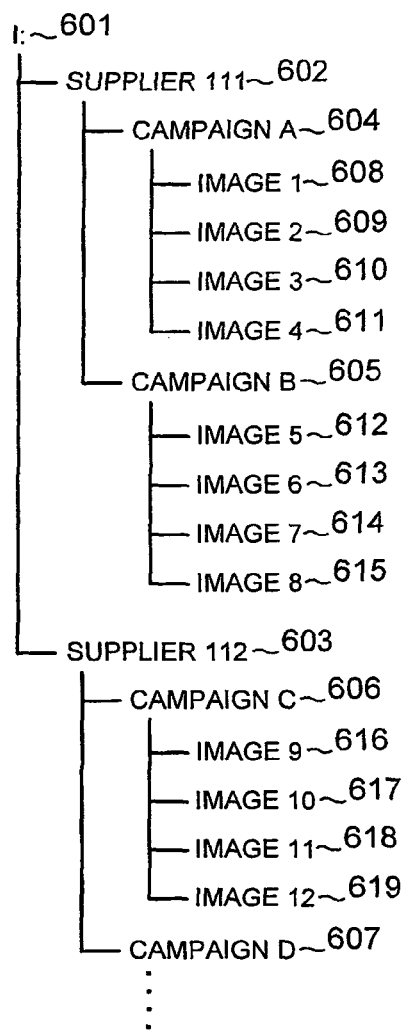
FIG. 6 illustrates a file directory for graphical images stored within the data bank identified in FIG. 4.

The storage of graphical images within image bank 405 is illustrated in FIG. 6. The data is effectively stored as a file system and the root directory has been identified at 601 as I: Beneath this, there is a sub-directory or folder for each particular supplier and in this example supplier 111 has a directory illustrated at 602 and supplier 112 has a directory illustrated at 603.

Within the folder for each supplier, additional folders or subdirectories are created for each specific campaign. Thus, supplier 111 has established a campaign A illustrated at 604, with an additional campaign, shown as campaign B at 605. Similarly, supplier 112 has established a campaign C as shown at 606 and campaign D as shown at 607.

Within each of these campaign subdirectories a plurality of files exist, each for a specific image. Thus, campaign A consists of image one shown at 608, image two shown at 609, image three shown at 610 and image four shown at 611. Similarly, campaign B comprises image five shown at 612, image six shown at 613, image seven shown at 614 and image eight shown at 615. In this example, the first image of a particular campaign may be suitable for being displayed on a conventional web browser running on a PC or similar. The second image is appropriate for being displayed on a web television system, the third image is suitable for being displayed on a WAP enabled mobile phone and a fourth image is suitable for being displayed on a hand held computer.

Thus, images of this type are included for campaign C, image nine at 616 being for a web browser, image ten at 617 being for a web TV, image eleven at 618 being for a mobile phone and image twelve and 619 being for a handheld computer.

Administration process 406 allows new suppliers to register with the service provider. The administration process 406 also allows existing suppliers to establish new campaigns and allows existing suppliers to modify existing campaigns.

Figure 7:
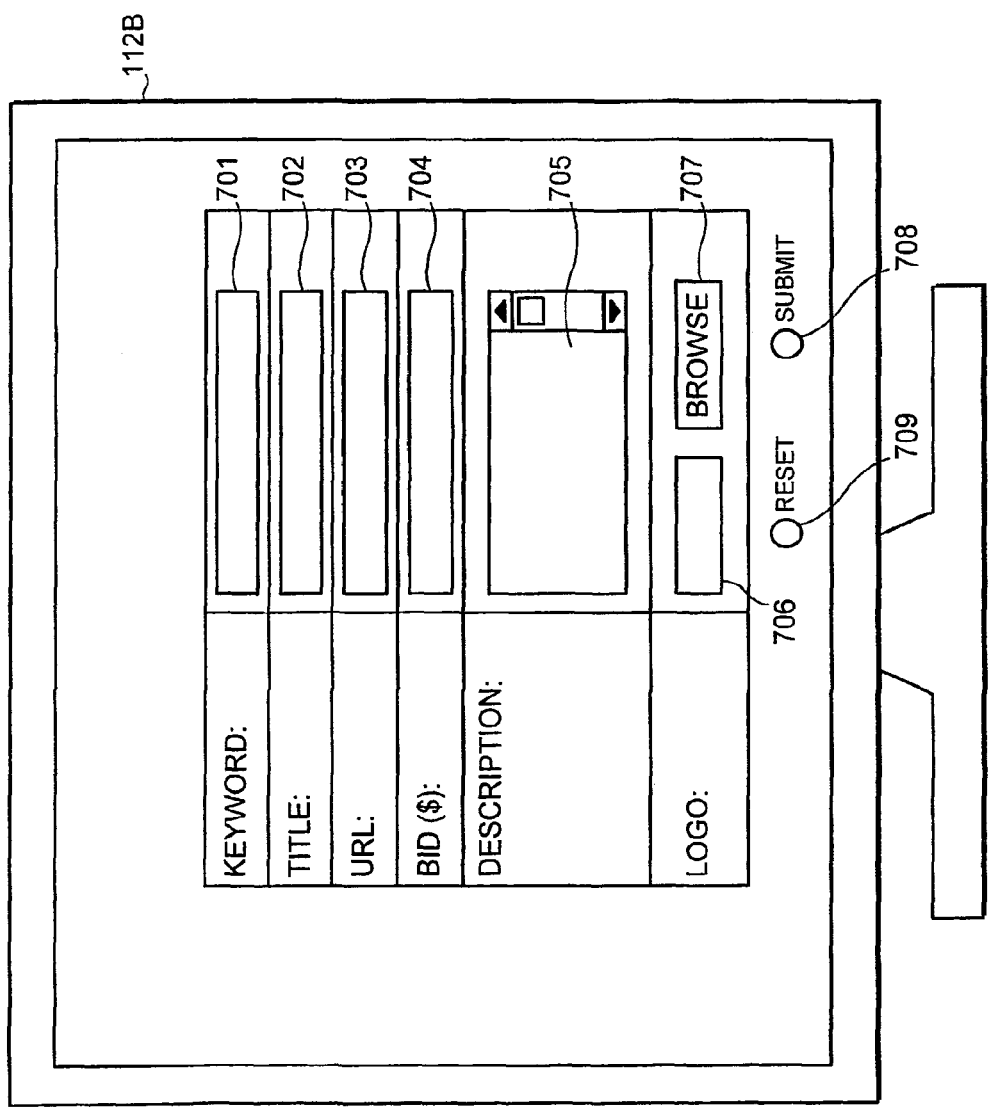
FIG. 7 illustrates a campaign generation form.

In order to establish a campaign, a supplier 112 contacts the service provider 121 over the world wide web 100 using a specific URL established for this purpose. In response, supplier 112, having a computer system 112A and a display monitor 112B receives a campaign generation form as illustrated in FIG. 7. In response to receiving the form shown in FIG. 7, displayed on monitor 112B, a supplier is invited to identify a particular keyword at entry 701. This keyword may be selected from a list of existing keywords or a supplier may wish to establish a new keyword.

At entry 702, the supplier enters a title and at entry 703 the supplier enters their URL, identifying the website that users will contact in response to an identification being made by the searching process. Thereafter, at location 705 a further description is included, up to a maximum number of characters, thereby completing the textural content of the particular entry for the particular campaign under consideration.

Entry 706 allows a file to be identified representing the supplier's logo. It is possible for a supplier to identify the location of a file directly or, in accordance with established windows com protocols, a browse button 707 may be selected resulting in a box being displayed showing a representation of the local file system and allowing a particular graphical file to be selected. Thereafter, details from the form may be submitted back to the service provider 121 by operation of submit button 708 or the form may be cleared by operation of reset button 709.

Upon operation of submit button 708, the information contained within the form is returned from the supplier 121 over the world wide web 100 back to the service provider 121.

In response to receiving information of the type illustrated in FIG. 7, the administration process 406 populates database 402 with the textural information and populates image bank 405 with appropriate graphical information. The administration process 406 interrogates the nature of the graphical information that has been submitted to ensure that the information has been conveyed in an acceptable protocol. If a judgment is made to the effect that the protocol is not appropriate, the supplier is contacted and invited to make an alternative submission. Once appropriate graphical information has been received by administration process 406 it is processed in order to render it into representations that are appropriate for the particular platforms that are being served. Thus, in response to receiving a single graphical image, relating to particular campaign, the administration process processes this graphical information in order to produce a graphical image appropriate for a web browser, with a further graphical image being produced that is appropriate for a web television, a further graphical image being produced that is appropriate for a WAP enabled mobile telephone and a further graphical image being produced that is appropriate for a handheld computer. These four (or more) images are then written to specific files and held within image bank 405.

After writing the graphical images to the image bank 405, image table 504 is populated with details as to the specific file locations for the images. Similarly, display table 503 is populated with a unique identification for the campaign, along with the title, description and URL provided by the supplier.

Similarly, table 502 is populated identifying the specific campaign, the keyword identified at 701 and the bid identified at 704. Thus, in this specific example, supplier 112 has expressed an interest in the keyword "saxophone". Supplier 112 has provided a graphical image that identifies its logo in an acceptable form. This graphical image has been processed to present the graphical image in the four representations being considered for this specific example. Furthermore, textural information has been written to display table 503 and a bid of forty cents has been written to field 524 of table 502. Thus, in response to a search on the keyword "saxophone" being initiated by a user, an appropriately indexed version of table 502 allows the keyword to be filtered in combination with an ordering exercise in order to place campaigns with the highest bids at the top of the list.

Figure 8:
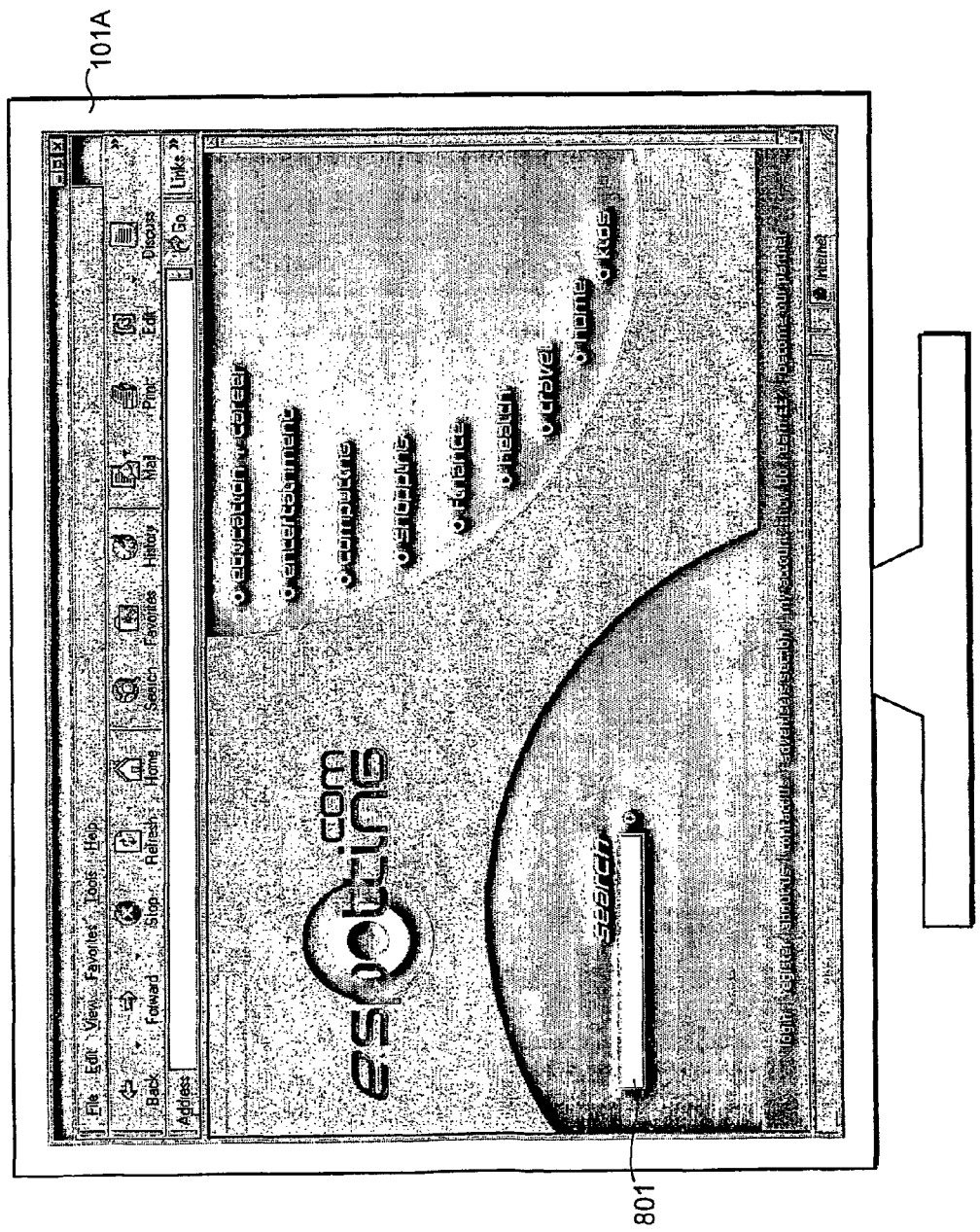
FIG. 8 shows a search request form.

After database 402 and image bank 405 have been populated, it is possible for a user, such as user 101, to perform a search. Service provider 121 is contacted via an appropriate URL, resulting in a page being returned to user 101 and being displayed on display unit 101a, as shown in FIG. 8. The user is invited to type a keyword at position 801 and then return the information back to the service provider 121. Thus, for example, a user may return the keyword "cars" resulting in a search being performed to return campaign related information for the keyword "cars" presented in a ranking determined by bid values established by suppliers.

Figure 9:
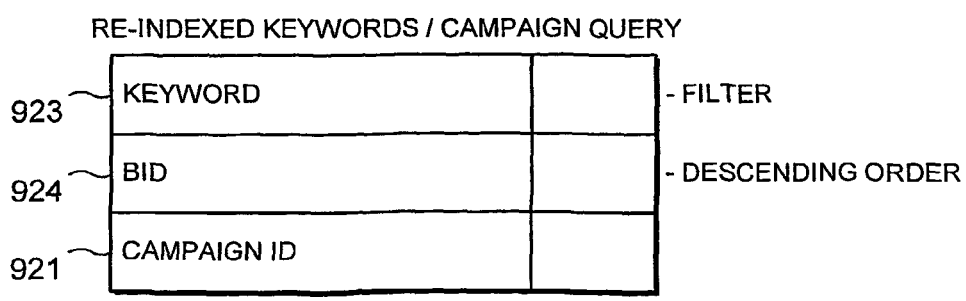
FIG. 9 illustrates a filtered query.

In order to perform the search, table 502 is re-indexed as shown in FIG. 9. In table 502, field 521 defining the campaign identification is the primary key and the table is ordered in an ascending fashion with the campaign identifications being place in numerical order, starting from the lowest and extending to the highest. This ordering is merely a reflection of the order in which the entries are created and does not assist in terms of the searching operation.

In order to perform a search, the table is re-indexed with the keyword entry at 523 establishing the main filtering term and may therefore be considered as the primary entry as shown at 923 in FIG. 9. The query also includes the bid value at 924 and the campaign unique identification at 921. For the purposes of this query, the supplier entry is not required and is therefore not included in the query.

Thus, the query results in a table being produced in which the keywords are presented alphabetically. A filtering operation is now performed in order to select campaigns that relate to the specific keyword. Thus, the filtering operation results in a list being produced of all campaigns concerning the keyword "cars". The operation now refers to the second field 924 concerning bids and organizes the listing in accordance with bid values in descending order. Thus, the campaign with the highest bid value is placed at the top of the list, followed by the next and continuing until the least highest bid. For bids of equal value, further ordering may be exercised in terms of campaign ID, such that the longest running campaigns are placed towards the top or in accordance with any other criteria.

Thus, as a consequence of the searching operation, all campaigns relating to the particular keyword have been selected and then placed in bid order. This results in a list of campaign identifications which is used to relate to display table 503 and is used to relate to image table 504. Thus, each identified campaign results in its specific title, descriptions and URL being read from display table 503 while maintaining the ranking established by the query shown in FIG. 9. In addition, an image is read from image table 504. The particular image read is determined by the campaign identification and is also determined by an indication of the nature of the equipment available to the requesting user. The appropriate graphical information is then associated with the textural information, a page of entries is assembled by image conversion process 404 and then the page of information is sent to the server process 403 allowing it to be dispatched to the user in the appropriate format.

Figure 10:
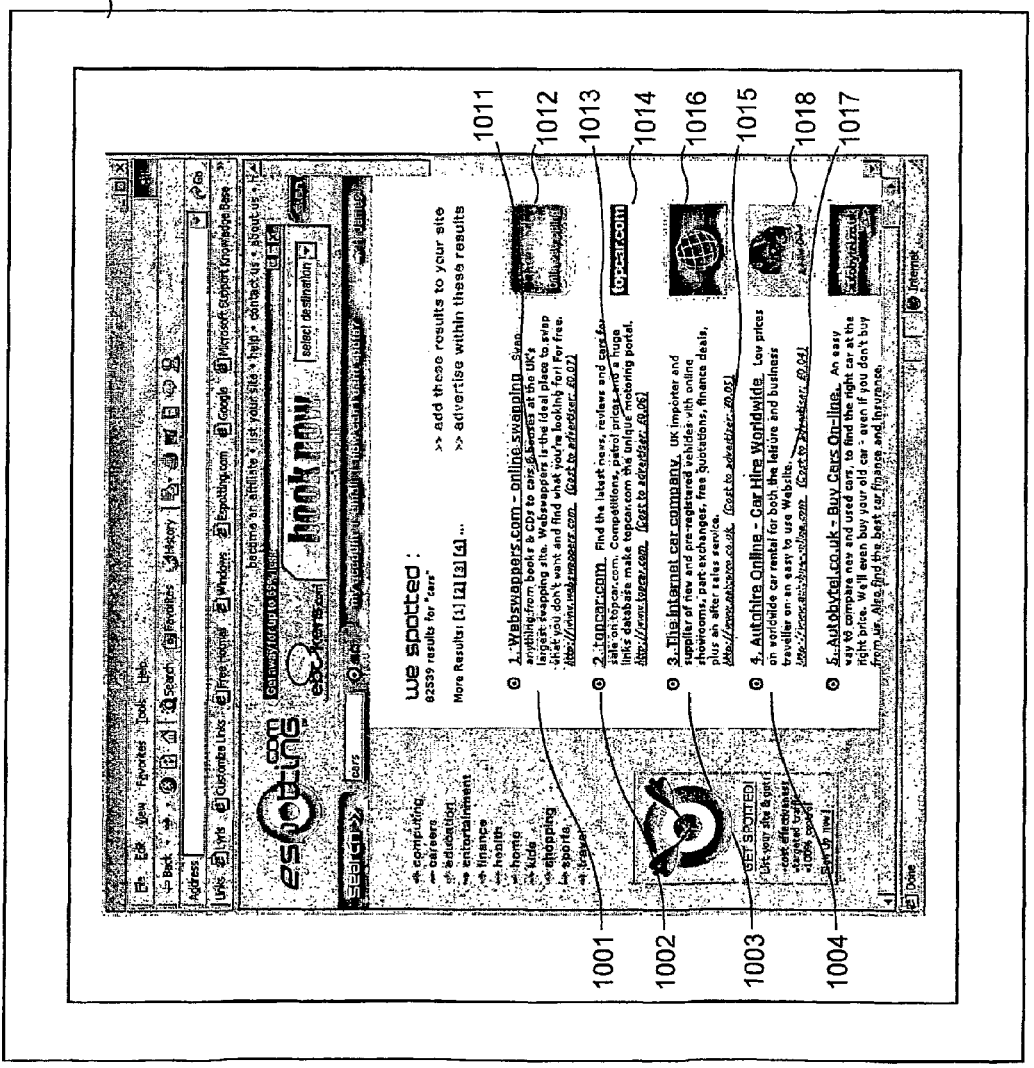
FIG. 10 shows an output image displayed on a computer.

The user request described with respect to FIG. 8 was initiated from a user's personal computer. As a result of this search, the search results are returned back to the user's computer and displayed on monitor 101a as illustrated in FIG. 10. Thus, the searched information consists of a plurality of entries 1001, 1002, 1003 and 1004 etc. Each entry such as entry 1001, includes a textural component 1011, read from database 402 and a graphical logo 1012 read from image bank 405. Similarly, entry 1002 includes a textural component 1013 and a logo 1014. Entry 1003 includes a textural component 1015 and a logo 1016. Similarly, entry 1004 includes a textural component 1017 and a logo 1018. Through advertising a marketing, logos 1012, 1014, 1016 and 1018 will have attained a significant degree of recognition and goodwill. Consequently, users are encouraged to make swift selections based on the easily recognizable graphical representations, thereby enhancing the service provided by the service provider.

Figure 11:
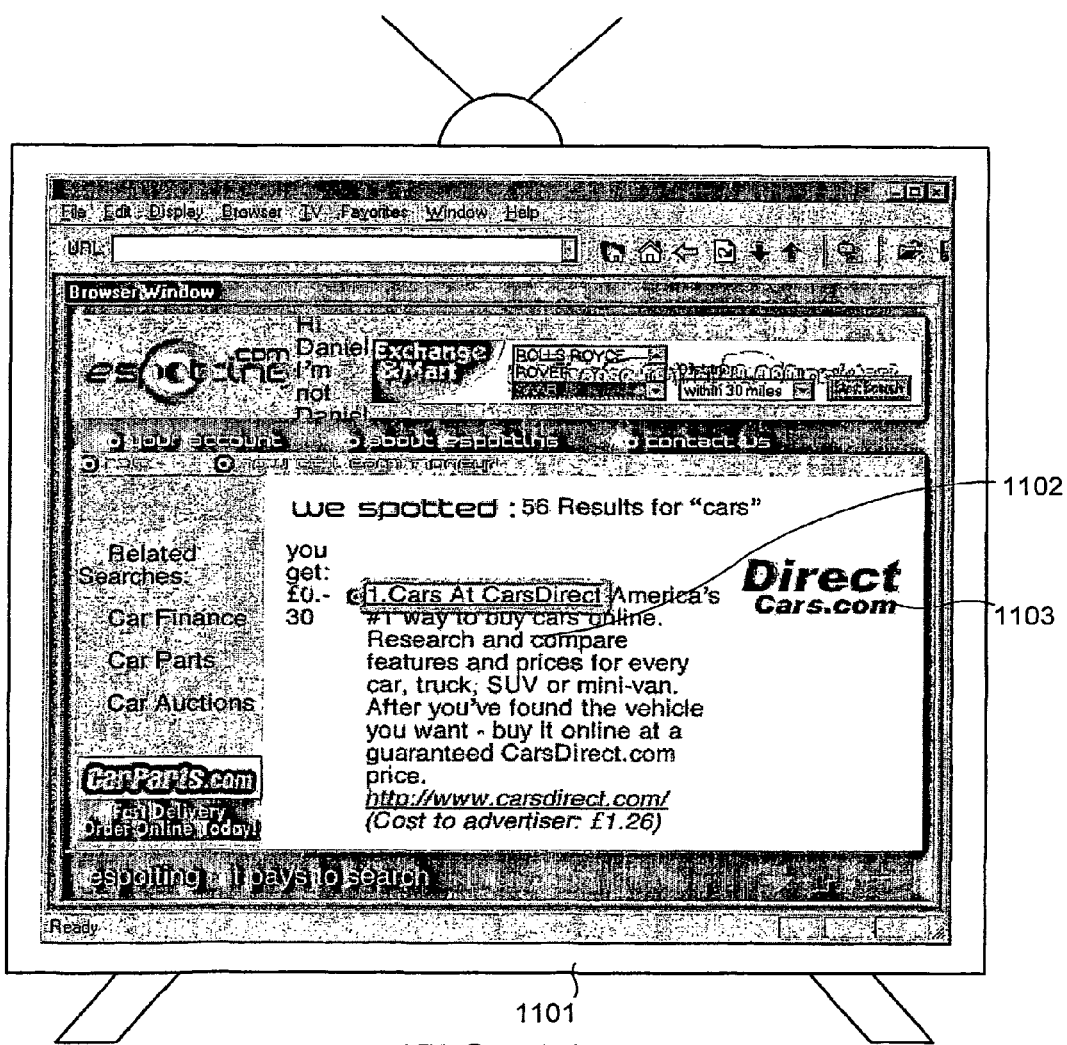
FIG. 11 shows an output image displayed on a web television.

The image shown in FIG. 10 has been read from file 608 for display on a conventional web browser executed by a personal computer. Alternatively, the information may be accessed by a web television 1101 as illustrated in FIG. 11. Television sets have a lower definition than most modern computer monitors, therefore the amount of information contained within a single window is less. However, for the same search, the same textural information is displayed. Thus, if viewing on a web television as shown in FIG. 11 textural information 1102 is derived from display table 503 and the exact same locations are read as would have been the case had the information been displayed on a computer system as shown in FIG. 10. However, for the computer system shown in FIG. 10, the graphical information is derived from file 608 whereas for the web television, in order to achieve a similar effect, the image information is read from file 609.

Figure 12B:
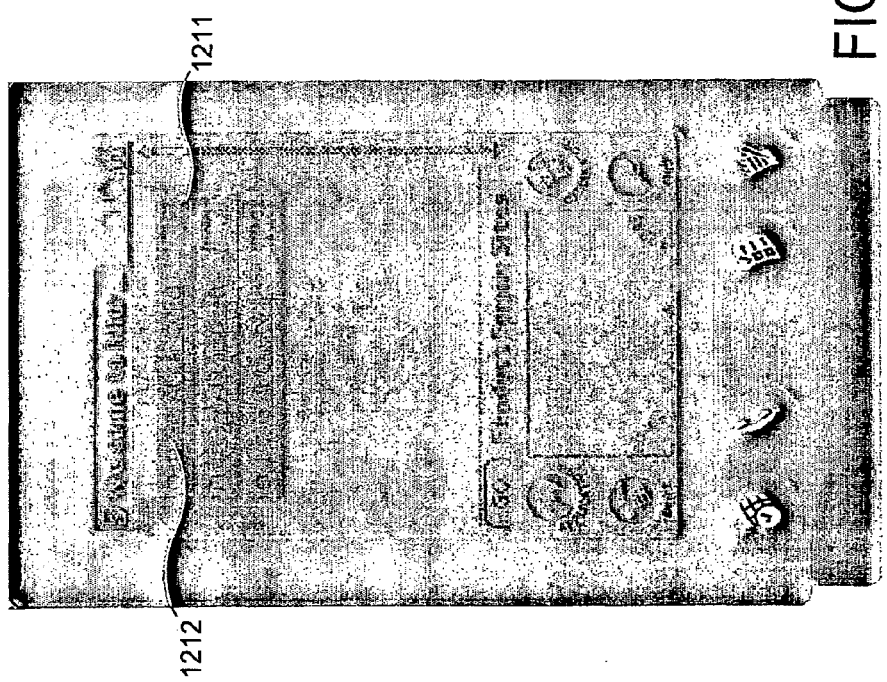
FIG. 12b shows an output image display on a handheld computer.
Figure 12A:
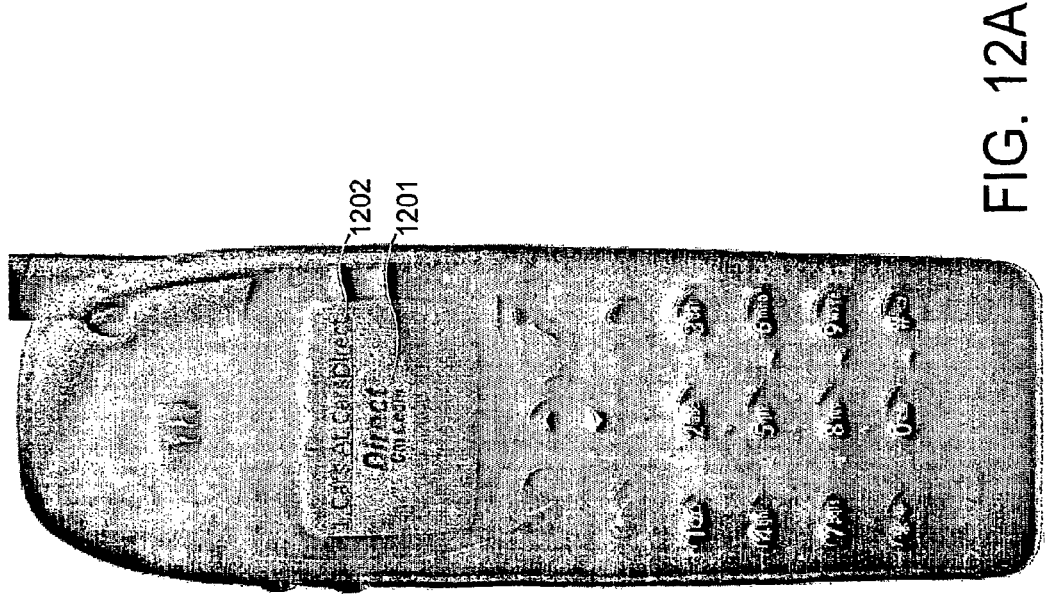
FIG. 12a shows an output image displayed on a WAP enable mobile phone.

Other graphical display devices are shown in the form of a WAP enabled mobile telephone in FIG. 12A and a hand held computer in FIG. 12B. Again, graphical information 1201 is shown on the WAP enabled mobile phone. However, whereas the textural information 1202 is derived from exactly the same source as textural information 1102, the graphical wage is derived from file 610 and then combined with the textural information by the image conversion process 404. Similarly, the hand held computer shown in FIG. 12B displays graphical information 1211 with textural information 1212. The textural information is derived from exactly the same place as the textural information 1202 and 1102 but on this occasion the graphical information is read from file 611.

It is to be appreciated that the term 'graphical image' as used throughout the specification is not limited to logos. Rather, it can be any image which is used as a trademark and as such could even be a stylized word identifying a particular supplier.

Having described a particular preferred embodiment of the present invention, it is to be appreciated that the embodiment in question is exemplary only and that variations and modifications such as will occur to those possessed of the appropriate knowledge and skills may be made without departure from the spirit and scope of the invention as set forth in the appended claims.

What is claimed is:

1. A computerized system for identifying commercial suppliers in response to a user search, comprising:

an image store for storing graphical images associated with commercial suppliers;

a storage media for storing textual items associated with at least one graphical image in the image store; and, a processor in communication with the image store and the storage media, the processor programmed to perform steps comprising:

populating the image store with graphical images separate from the textual items for the storage media;

receiving a keyword and associating the keyword with at least one textual item;

linking the at least one textual item to at least one of the graphical images; and, providing a displayable output list of the textual items corresponding to the received keyword and the displayable graphical images linked thereto, such that when the displayable output list is displayed, a user may readily identify a desired commercial supplier from the displayable graphical images in the displayable output list.

* * * * *